Figure 5:
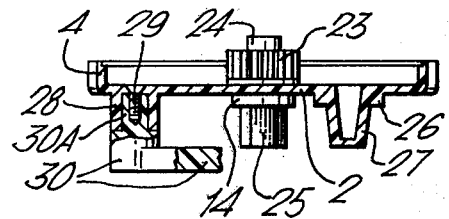

United States Patent [19]

Arbib

[11] 3,999,725
[45] Dec. 28, 1976

[54] DEVICE FOR TRANSFERRING MAGNETIC RECORDING TAPE FROM ONE HUB TO ANOTHER IN A TAPE CASSETTE

[75] Inventor: Philip Brian Arbib, Chalfont St. Peter, England

[73] Assignee: Bib Hi-Fi Accessories Limited, Hempstead, England

[22] Filed: June 6, 1975

[21] Appl. No.: 584,473

[30] Foreign Application Priority Data

Dec. 16, 1974 United Kingdom ............ 54312/74

[52] U.S. Cl. ............................... 242/199; 242/55; 242/96; 242/179
[51] Int. Cl.² .................... G03B 1/04; G11B 15/32; G11B 23/04
[58] Field of Search ................... 242/179, 197–200, 242/55, 68.3, 96

[56] References Cited

UNITED STATES PATENTS

| | | | |
|---|---|---|---|
| 1,716,879 | 6/1929 | Dworsky | 242/179 |
| 2,466,524 | 4/1949 | Williams | 242/199 X |
| 2,868,469 | 1/1959 | Sullivan | 242/55 |
| 2,926,861 | 3/1960 | Murdoch | 242/200 |

FOREIGN PATENTS OR APPLICATIONS 601,196  4/1948  United Kingdom ............... 242/179

Primary Examiner—Leonard D. Christian
Attorney, Agent, or Firm—Finnegan, Henderson, Farabow & Garrett

[57] ABSTRACT

A hand-operated device for transferring magnetic recording tape from one hub to the other in a cassette of such tape comprises a housing containing parts of transmission means between an operating handle and a projection, both outside the housing. The projection is designed to extend into a hole through the cassette and co-operate with the inwardly directed teeth on one hub to drive it. The projection rotates at a greater speed than does the operating handle. Preferably another projection simultaneously extends into another hole through the cassette but does not interfere with the rotation of the other hub.

9 Claims, 6 Drawing Figures

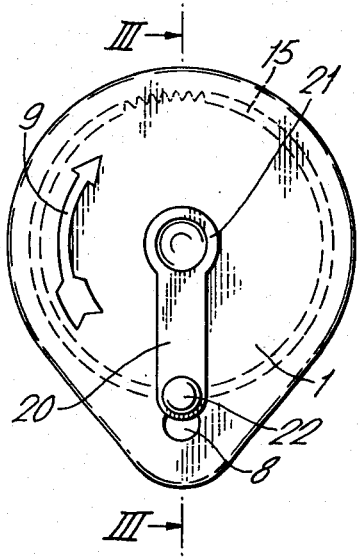
FIG.1.
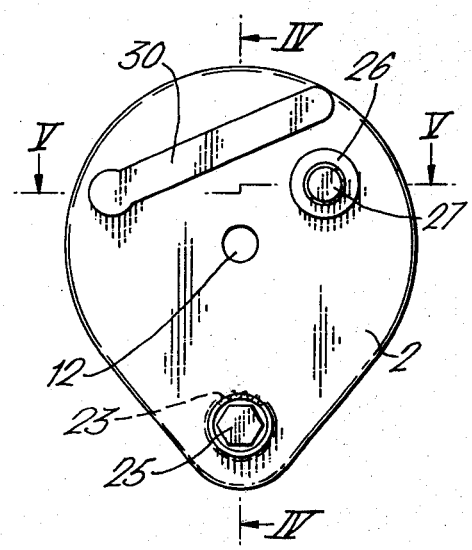
FIG.2.
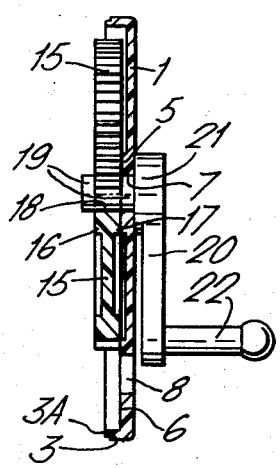
FIG.3.
FIG.4.

DEVICE FOR TRANSFERRING MAGNETIC RECORDING TAPE FROM ONE HUB TO ANOTHER IN A TAPE CASSETTE

This invention is concerned with a cassette (referred to below as "a cassette of the type defined") comprising a rectangular casing which is approximately 100mm. long, 64mm. wide and 9mm. thick and two hubs in the casing carrying magnetic recording tape and arranged to rotate about axes approximately 43mm. apart, there being two holes through the cassette into which project inwardly directed teeth on the hubs for use in driving the hubs to transfer tape from one to the other. Such cassettes are sold under various names including "Phillips compact cassette" and "Musicassette".

According to the invention, there is provided a device for transferring magnetic recording tape from one hub in a cassette of the type defined to the other hub in the cassette, the device comprising a housing on the outside of which are a rotatable operating handle and a rotatable projection and inside which are parts of a transmission means coupling the operating handle to the projection such that the projection rotates at a greater speed than does the operating handle, the projection being such as to extend into one of the above-mentioned holes through a cassette of the type defined and engage the inwardly directed teeth of one hub so as to drive the hub and cause tape to be transferred to it from the other hub, there being a second projection which extends from the housing and can project into the other hole through the cassette simultaneously with the first projection extending into said one of the holes but the second projection remains out of contact with the inwardly directed teeth of the hub associated with the hole into which the second projection extends.

The transmission means may include a first wheel which rotates with the operating handle about the same axis as the latter and a second wheel which rotates with the projection about the same axis as the latter, both wheels being in the housing. The two wheels may be gear wheels which mesh with one another or wheels which are coupled by a band or belt. The ratio between the speeds of the projection and the operating handle may be 3:1, 6:1, 10:1 or any convenient value.

Preferably the housing is flat, the operating handle and the projection being on opposite sides of the housing, i.e. they have housing between them. Then the outline of each major face of the housing is conveniently two part-circles of very different radii joined by two straight lines on opposite sides of the major face each of which is tangential to both part-circles. Then, preferably, the axis of rotation of the operating handle passes through the centre of the larger-radius part-circle and the axis of rotation of the projection passes through the centre of the smaller-radius part-circle.

The projection, at least at its tip, may have a shape of cross-section which is a regular hexagon, each apex of which, when the projection is inserted into one of said holes through the cassette, lies between two inwardly directed teeth of one of the hubs, the distance between two opposite sides of the hexagon being 7.2 mm. The second projection is preferably of circular cross-section. The arrangement is such that this and the first projection can simultaneously project into the above-mentioned holes through the cassette but the second projection does not interfere with the rotation of the hub from which tape is to be drawn because the projection is out of contact with it since it is too short to reach its teeth or too thin where it is surrounded by the ring of teeth.

According to the invention there is also provided a device for transferring magnetic recording tape from one hub in a cassette of the type defined to the other hub in the cassette, the device comprising a housing on the outside of which are a rotatable operating handle and a rotatable projection and inside which are parts of a transmission means coupling the operating handle to the projection such that the projection rotates at a greater speed than does the operating handle, the projection being such as to extend into one of the holes through a cassette of the type defined and engage the inwardly directed teeth of one hub so as to drive the hub and cause tape to be transferred to it from the other hub, said device having on the outside of the housing a pivotally mounted arm which can be swung, when the first-mentioned projection is in one of the holes, into a position in which it lies across and adjacent one face of the cassette and holds the cassette to said device. Alternatively or in addition, the device according to the invention may be mounted on a cassette recorder and used to manually rewind or wind-on one tape whilst another is being played on the same recorder.

Figure 6:
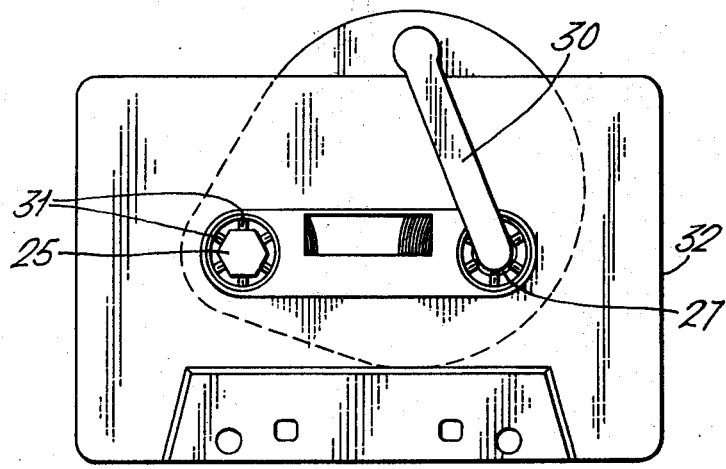

An example in accordance with the invention is described below with reference to the accompanying drawings, in which:

FIGS. 1 and 2 show elevations of the front and the back, respectively, of a device according to the invention, FIGS. 3 and 4 show sectional side views of parts of the device, taken as indicated by the arrows III and IV, respectively, in FIGS. 1 and 2, FIG. 5 shows a sectional side view of part of the device, taken as indicated by the arrows V in FIG. 2, and FIG. 6 shows the device mounted on a cassette of the type defined.

The illustrated device is made of plastics material except for a screw which is mentioned below and it includes a flat housing formed of two parts 1 and 2. The outline of each major face of the housing is two part-circles of very different radii joined by two straight lines on opposite sides of the major face each of which is tangential to both part-circles. A flange 3 with a projecting portion 3A is provided at the periphery of the part 1 and a flange 4 with a recess 4A to receive the projecting portion 3A is provided at the periphery of the part 2, the parts 1 and 2 being fastened together with an adhesive or by welding, for example ultrasonic welding.

The part 1 is formed with two bosses 5 and 6 inside the housing and with holes 7 and 8 passing through the part 1 at the bosses. Outside the housing there is a moulded arrow 9 on the part 1. The part 2 is formed with two bosses 10 and 11 inside the housing and holes 12 and 13 through the part 2 at these bosses, the hole 13 being enlarged outside the housing, where it is surrounded by a circular flange 14.

Inside the housing is a gear wheel 15 formed with bosses 16 and 17 at the centre through which passes a hole 18 into which is push-fitted a rod 19 which passes through the hole 7 in the part 1 and is integral with an arm 20 and with a boss 21. A hole (not shown) is formed in the arm 20 and into it is fitted a pin 22 which can turn in the hole but cannot easily be pulled out of it. The pin 22 forms an operating handle for turning the gear wheel 15 about its axis, on which lies the centre of one of the part-circles mentioned above, i.e. the one with the larger radius. Part of the rod 19 projects beyond the gear wheel 15 and into the hole 12 in the part 2. The housing contains another and smaller gear wheel 23 on the axis of which lies the centre of the other of the part-circles mentioned above. This gear wheel meshes with the gear wheel 15 and has a pin 24 of circular cross-section push-fitted into a hole through its centre. Parts of the pin 24 lie in the holes 8 and 13 and the pin has an enlarged head 25 constituting a projection which, like the operating handle, is outside the housing but is on the side of the housing opposite to that on which the operating handle is disposed. The cross-section of the head 25 has the shape of a regular hexagon, part of it being surrounded by the flange 14. When the pin 22 is gripped between thumb and forefinger and turned about the axis of the wheel 15 in the direction of the arrow 9, the pin 24 rotates abouts its axis in the opposite direction and at a much greater rate than the operating handle.

The part 2 is also formed, outside the housing, with a boss 26 and a tapered spigot 27 extending from it, both hollow, and a tubular boss 28 into which is inserted a projection 30A on an arm 30, this projection being held by a screw 29 so that the arm 30 can turn about the axis of the screw 29.

As shown in FIG. 6, the projection consisting of the head 25 of the pin 24 is inserted into one of the holes through a cassette 32 of the type defined and the projection consisting of the spigot 27 is inserted into the other hole through the cassette. The corners of the hexagon of the head 25 lie between adjacent ones of the teeth 31 in one hub but where the spigot 27 passes through the ring of teeth on the other hub its diameter is 7.1 mm. i.e. smaller than the diameter of the circle on which lie the tips of the ring of teeth so that the spigot 27 helps locate the cassette but does not interfere with the rotation of the hub from which tape is to be drawn.

When applying the device to the cassette 32, or a cassette to the device if the latter is fixed, (possibly to a recording and/or playback instrument) the arm 30 is swung so that its free end extends away from the spigot 27. When the spigot 27 and the pin head 25 are in the holes through the cassette, the arm 30 is swung so that it lies across and adjacent one major face of the cassette and its free end bears on the tip of the spigot 27. Now when the pin 22 is turned in the direction of the arrow 9 and the pin head 25 turns in the opposite direction, tape is transferred to the hub in which the pin head 25 is inserted, from the other hub. To wind the tape back the other way, the face of the cassette which previously was facing away from the part 2 is now made to face towards it and the process is repeated with the positions of the parts 25 and 27 in the holes reversed.

The axes of the spigot 27 and the pin 24 are about 43mm. apart, to suit a cassette of the type defined.

I claim:

1. A device for transferring magnetic recording tape from one hub in a cassette of the type defined to the other hub in the cassette, the device comprising a housing on the outside of which are a rotatable operating handle and a rotatable first projection and including a transmission means coupling the operating handle to the first projection such that the first projection rotates at a greater speed than does the operating handle, the first projection being such as to extend into one of the holes through a cassette of the type defined and engage the inwardly directed teeth of one hub so as to drive the hub and cause tape to be transferred to it from the other hub, said device further comprising a second projection which extends from the housing and can project into the other hole through the cassette simultaneously with the first projection extending into said one of the holes but the second projection remains out of contact with the inwardly directed teeth of the hub associated with the hole into which the second projection extends.

2. A device according to claim 1 in which the transmission means includes a first wheel which rotates with the operating handle about the same axis as the latter and a second wheel which rotates with the first projection about the same axis as the latter, both wheels being in the housing.

3. A device according to claim 2 in which the wheels are gear wheels which mesh with one another.

4. A device according to claim 1 in which the housing is flat and between the operating handle and the first projection.

5. A device according to claim 4 in which the outline of each major face of the housing is two part-circles of very different radii joined by two straight lines on opposite sides of the major face each of which is tangential to both part-circles.

6. A device according to claim 5 in which the axis of rotation of the operating handle passes through the centre of each larger radius part-circle and the axis of rotation of the first projection passes through the centre of each of the other part-circles.

7. A device according to claim 1 in which at least the tip of the first projection has a shape of cross-section which is a regular hexagon, each apex of which, when the first projection is inserted into one of said holes through the cassette, lies between two inwardly directed teeth on one of the hubs.

8. A combination of a device according to claim 1 and a cassette of the type defined having the said mentioned projections in said holes through the cassette.

9. A device for transferring magnetic recording tape from one hub in a cassette of the type defined to the other hub in the cassette, the device comprising a housing on the outside of which are a rotatable operating handle and a rotatable projection and including a transmission means coupling the operating handle to the projection such that the projection rotates at a greater speed than does the operating handle, the projection being such as to extend into one of the holes through a cassette of the type defined and engage the inwardly directed teeth of one hub so as to drive the hub and cause tape to be transferred to it from the other hub, said device having on the outside of the housing a pivotally mounted arm which can be swung, when said projection is in one of the holes through the cassette, into a position in which it lies across and adjacent one face of the cassette and holds the cassette to said device.

* * * * *